United States Patent Office 3,471,462
Patented Oct. 7, 1969

3,471,462
CATALYTIC PRODUCTION OF POLYBUTADIENE AND CATALYSTS THEREFOR
Tsuyoshi Matsumoto, Tokuo Ito, Kouei Komatsu, Hidetoshi Yasunaga, and Kenichi Ueda, Yokkaichi-shi, Japan, assignors to Japan Synthetic Rubber Co., Ltd., Chuo-ku, Tokyo, Japan, a corporation of Japan
No Drawing. Filed Apr. 22, 1965, Ser. No. 450,194
Claims priority, application Japan, Oct. 22, 1964, 39/59,664
Int. Cl. C08d *1/14;* B01j *11/00*
U.S. Cl. 260—94.3        15 Claims

ABSTRACT OF THE DISCLOSURE

A process for producing cis-1,4 polybutadiene with a high polymerization velocity by contacting butadiene with a specific catalyst. The catalyst is prepared by mixing, in the presence of a hydrocarbon solvent, a first component of at least one compound selected from the group consisting of nickel salts of carboxylic acids and organic complex compounds of nickel, a second component of at least one compound selected from the group consisting of boron fluoride and complex compounds thereof, a third component of at least one compound selected from the group consisting of organometallic compounds of alkali metals and metals of Groups II and III of the Periodic Table and a fourth component of an aliphatic hydrocarbon having two conjugated double bonds, in such a way that the fourth component is added before the reaction between the first and third components, and subjecting the resulting mixture to aging at a temperature of 20° C. to 100° C.

---

This invention relates to a method for producing polybutadiene having a high cis-1,4 content. More particularly it relates to a method for producing polybutadiene having a high cis-1,4 content with a novel catalyst soluble in hydrocarbons, having high activity and capable of controlling molecular weight of the polymer, and to polybutadiene produced thereby.

It is known that polybutadiene having a high cis-1,4 content can be prepared by contacting butadiene in liquid phase with a catalyst consisting of (1) at least one compound selected from the group consisting of nickel salts of carboxylic acid and organic complex compounds of nickel, (2) at least one compound selected from the group consisting of boron fluoride and complex compounds thereof and (3) at least one compound selected from the group consisting of organometallic compounds of alkali metals and the metals of Groups II and III of the Periodic Table. See e.g. U.S. Patents 3,170,905 and 3,170,907.

The above method is effective to produce butadiene polymer having a high cis-1,4 content with high yield, but there are still some points which can be improved. Namely the catalyst used in the method is not perfectly soluble in hydrocarbons, i.e. it produces a black precipitate in concentrated solution, and although it appears to be soluble in diluted solution, it shows a Tyndall phenomenon. When a polymerization system contains a large amount of impurities or when the monomer concentration is low, the polymerization activity of the above catalyst decreases.

An object of the present invention is to provide a method which produces high molecular weight polymer of butadiene with a catalyst having sufficiently high polymerization activity even under the above-mentioned conditions. Another object of the present invention is to provide a method which requires a smaller amount of the expensive organometallic compound or boron fluoride than is required in the known methods. A further object of the present invention is to provide a method, which makes the control of the molecular weight of the polymer easier.

These and other objects can be attained by the present invention which is characterized by adding further as a catalyst component, an aliphatic hydrocarbon containing two conjugated double bonds, under specified conditions to the above-mentioned catalyst components and subjecting the resulting mixture to aging at a specified temperature. In accordance with the present invention, the first component of at least one compound selected from the group consisting of nickel salts of carboxylic acids and organic complex compounds of nickel, the second component of at least one compound selected from the group consisting of boron fluoride and complex compounds thereof, the third component of at least one compound selected from the group consisting of organometallic compounds of alkali metals and the metals of Groups II and III of the Periodic Table and the fourth component of an aliphatic hydrocarbon having two conjugated double bonds are mixed in the presence of a hydrocarbon solvent in such a way that the fourth component is added before the first and the third components react with each other, and the resulting mixture of four catalyst components is subjected to aging at a temperature between 20° and 100° C., after which butadiene is brought into contact with same in the liquid phase to obtain butadiene polymer having a high cis-1,4 content.

In the present invention, the fourth component must be added before the reaction between the first and the third components. For example the catalyst components may be mixed in the following sequences.

(1) The second component is added to the first, then the fourth and finally the third components are added.
(2) The fourth component is added to the first, then the third and finally the second components are added.
(3) The third component is added to the second, then the fourth and finally the third components are added.

Further in the preparation of the present catalyst, the mixture of these four components must be subjected to aging at a temperature between 20° and 100° C. preferably between 30° and 80° C. The aging time varies according to other conditions but generally it is from several minutes to several hours.

The order of addition of the fourth component and the aging of the mixture are indispensible conditions for the preparation of the present catalyst. On account of these conditions it has now become possible to prepare a catalyst which is soluble in hydrocarbon solvents, has extremely high polymerization activity and is efficacious in easily controlling the molecular weight of the polymers. For example it is impossible to obtain a catalyst having the above-mentioned characteristics if the order of addition is changed in such a way that the fourth component is added after the mixing of the other three components, or the fourth and the second components are added after the reaction of the first component with the third.

The three-component catalyst proposed previously by the inventors of the present invention produces a black precipitate in a concentrated solution, and in a diluted solution it appears to be soluble but shows a Tyndall phenomenon in hydrocarbon solvents. On the other hand in the case of the catalyst of the present invention, even when the first component is insoluble or when a precipitate is formed by the reaction of the first and the second components, the catalyst is rendered soluble in hydrocarbon solvent by the final aging reaction and the finally formed catalyst does not show a Tyndall phenomenon.

The three-component catalyst solution is brown or black but the four-component catalyst solution of the present invention is yellow or orange. Accordingly the color of the two catalyst solutions, i.e. the absorption spectrum of visible rays, are different. Both catalysts are considered to be complex compounds having nickel atoms in their centers. It is generally recognized that the color of a metal complex compound varies according to the valency state of the central atom or to the kind of surrounding ligand.

From these points, the present catalyst is considered to be a complex compound different from the three-component catalyst.

It is recognized that the present catalyst can produce a much greater amount of polymer per unit catalyst amount per unit time. In other words, it affords much greater polymerization velocity per constant amount of the catalyst when compared with the three-component catalyst. Furthermore in many cases it can produce polymers having higher molecular weights with greater polymerization velocity than the three-component catalyst. It is also made clear that with an amount of catalyst insufficient to produce polymer in the case of the three-component catalyst, the polymerization reaction proceeds with sufficient velocity in the case of the present catalyst. It is therefore possible to reduce the amount of expensive organometallic compound or boron fluoride to be used per unit amount of polybutadiene and also to produce high molecular weight polymers with sufficient velocity even when the polymerization system contains too much impurity or when the monomer concentration is too low. Further the catalyst residue remaining in the produced polymers is so small that it is possible to avoid unfavorable effects on the properties and the appearance of the product.

Since the physical properties and processability of cis-1,4 polybutadiene are greatly influenced by the molecular weight, it is important to control the molecular weight of polymers. In the present invention it is possible to control the molecular weight of polymers easily by varying the temperature at which the catalyst is aged. Namely the intrinsic viscosity measured in toluene at a temperature of 30° C. can be easily changed within the range 0.5–6.0 by varying the aging temperature between 20° C. and 100° C. In this case, up to a certain temperature, the higher the aging temperature is, the higher the molecular weight of the resulting polymer is.

Further it is convenient that the change of polymerization velocity is small in a certain range of the aging temperature, though the range varies according to the kinds and the proportions of the catalyst components. Accordingly it is possible to control the molecular weight of polymers easily without substantially changing the polymerization velocity by controlling the aging temperature within this range.

In Japanese patent publication 14643/62, there is described a method for catalyst stabilization, in which a diolefin is added to the catalyst produced by contacting diethyl aluminum halide $AlR_2X$ (wherein R is an alkyl radical and X is a halogen atom) with a hydrocarbon soluble complex compound of a cobalt salt. This method is an attempt to maintain the catalyst activity for a long time by adding a diolefin to the catalyst consisting of $AlR_2X$ and a hydrocarbon soluble complex compound of a cobalt salt.

The method of the present invention is substantially different from the above-mentioned method in the following points. First, the catalyst components other than the fourth component (an aliphatic hydrocarbon having two conjugated double bonds) are different. If a cobalt compound is used instead of nickel compound in the catalyst of the present invention, the above-mentioned characteristics cannot be obtained. Secondly, in the present method, each component of the catalyst is added according to a specified sequence and by subjecting the resulting mixture to aging a catalyst is prepared, which is capable of easily controlling the molecular weight of polymers by regulating the aging temperature and which has remarkably greater polymerization velocity.

On the other hand the above-cited method does not have such characteristics as those of the present method.

The first component of the catalyst of the present invention is at least one compound selected from the group consisting of nickel salts of carboxylic acids and organic complex compounds of nickel, including nickel formate, nickel acetate, nickel octenate, nickel naphthenate, nickel stearate, nickel benzoate, nickel carbonyl, nickel salicylaldehyde, nickel acetylacetone, nickel acetoacetate, bis ($\alpha$-furyl dioxime) nickel, bis (salicylaldehyde) ethylene diimine nickel and similar compounds. Of these compounds, there are some which are insoluble in hydrocarbon solvents. However when they are milled well and mixed with the other three components in the above-mentioned order and subjected to aging they turn gradually soluble.

The second component is boron fluoride or a complex compound thereof, e.g. boron fluoride etherate.

The third component is at least one compound selected from the group consisting of organometallic compounds of alkali metals and the metals of Groups II and II of the Periodic Table, including butyl lithium, amyl sodium, diethyl zinc, diethyl cadmium, triethyl aluminum, diethyl aluminum fluoride, diethyl aluminum chloride and the like.

The fourth component of the present catalyst is an aliphatic hydrocarbon having two conjugated double bonds, and butadiene, isoprene, dimethyl butadiene and the like are included therein.

The amount of the catalyst is usually in the range from 0.025 to 2.6 mg. atom of nickel based upon the first component per 100 grams of butadiene, or 0.00025–0.026 mg. atom per gram of butadiene. The proportion of each catalyst component is as follows; i.e. 0.02 to 2 mols of the first component, 0.2 to 10 mols of the second component and 0.2 to 20 mols of the fourth component per mol of the third component.

It is preferable to mix each component in the form of a hydrocarbon solution thereof. The hydrocarbon solvent includes aromatic hydrocarbon such as benzene, toluene, xylene or the like, aliphatic hydrocarbon such as pentane, hexane, heptane, or the like, or alicyclic hydrocarbon such as cyclohexane, decalin or the like.

The prepared catalyst is brought into contact with the butadiene to be polymerized in the liquid state and in the presence of a hydrocarbon solvent at the desired polymerization temperature for a given time. The catalyst preparation and the polymerization reaction must be carried out in an atmosphere of an inert gas such as nitrogen, helium, carbon dioxide or the like.

The same hydrocarbon solvent as that used in the above-mentioned catalyst preparation can be used as the polymerization medium. The polymerization temperature is from $-20°$ C. to 150° C., but in order to obtain polymers having high cis-1,4 content, polymerization temperatures from 0° C. to 100° C. are preferable.

The polymerization reaction can be discontinued by adding a reaction terminating agent such as water, alcohol, an amine or the like to the polymerization system when desired.

Solid polymers can be obtained either by adding a large amount of alcohol to the polymer solution or by eliminating the solvent together with water by azeotropic distillation. An antioxidant such as phenyl beta-naphthylamine can be added to the polymer solution. Further if required, an extender oil or other chemicals can be added.

The catalyst of the present invention is exceedingly active and a small amount of same is sufficient for polymerization, so that there is no need of eliminating catalyst residue from the resulting polymers.

The resulting polymer usually contains more than 90 percent of cis-1,4 units when analysed by the D. Morero method (La Chimica e L'industria, vol. 41, p. 758 (1959)). Butadiene polymer having even more than 97 percent of cis-1,4 units can be obtained.

The butadiene polymer obtained by the present invention can be compounded, molded and vulcanized by typical methods and applied to various uses such as tires, belts, hoses and the like.

The following examples are given to illustrate the present invention but it is to be understood that the examples are merely illustrative and not intended to limit the scope of the invention.

Intrinsic viscosities $[\eta]$ in the examples were measured in toluene at a temperature of 30° C.

Examples 1–3

Nickel naphthenate in an amount containing 0.01 mg. atom nickel, dissolved in 5 milliliters of toluene, was charged in a pressure-resistant reaction tube and 0.136 millimol of boron trifluoride etherate dissolved in 5 milliliters of toluene was added thereto. The mixture was subjected to reaction at a temperature of 20° C. for 10 minutes. Then 3.0 millimols of butadiene dissolved in 5 milliliters of toluene, and 0.15 millimol of triethyl aluminum dissolved in 5 milliliters of toluene were added in the order described. The mixed solution of the 4 components was subjected to aging for 15 minutes at temperatures indicated in Table 1. The catalyst solution was yellowish orange and transparent.

22 milliliters of toluene and 3.91 grams of butadiene were added to the catalyst and polymerization was conducted at a temperature of 40° C. for 55 minutes, after which methanol was added to terminate the polymerization. The results are shown in Table 1.

Example 5

To nickel naphthenate containing 0.01 mg. atom of nickel, dissolved in 5 milliliters of hexane, 3.1 millimols of butadiene dissolved in 5 milliliters of hexane were added, and then 0.15 millimol of triethyl aluminum dissolved in 5 milliliters of hexane was added to the mixture. Subsequently 0.15 millimol of boron trifluoride etherate dissolved in 5 milliliters of toluene was added thereto, and the mixture was subjected to aging at a temperature of 60° C. for 15 minutes. The color of the catalyst thus prepared was yellowish orange.

3.91 grams of butadiene were polymerized in 22 milliliters of hexane in the presence of the catalyst at 40° C. for 45 minutes.

The result is as follows:

Yield _____percent__ 80.2
$[\eta]$ _____ 3.23
Cis-1,4 _____percent__ 97.5
Trans-1,4 _____do____ 2.1
1,2- _____do____ 0.4

An experiment was carried out as a control in which butadiene was not used as a catalyst component. The catalyst was prepared by contacting triethyl aluminum with nickel naphthenate at 0° C. for 10 minutes and then by contacting boron trifluoride etherate with the resulting mixture at 0° C. for 10 minutes. The polymerization was carried out with the same amount of solvent and butadiene at 40° C. for 60 minutes.

The result is as follows:

Yield _____percent__ 21.4
$[\eta]$ _____ 3.29
Cis-1,4 _____percent__ 96.8
Trans-1,4 _____do____ 1.3
1,2- _____do____ 1.9

Example 6

The polymerization of butadiene was carried out according to the same method as in Example 1 except

TABLE 1

| Example | Aging temperature | Yield (percent) | $[\eta]$ | Cis-1,4 (percent) | Trans-1,4 (percent) | 1,2- (percent) |
|---|---|---|---|---|---|---|
| 1 | 60 | 75.4 | 3.27 | 97.8 | 1.2 | 1.0 |
| 2 | 50 | 76.5 | 2.83 | 96.6 | 2.1 | 1.3 |
| 3 | 40 | 72.1 | 2.55 | 98.1 | 1.1 | 0.8 |

An experiment was carried out as a control in which butadiene was not added as a catalyst component. In this case, the catalyst was prepared by aging the catalyst component mixture at a temperature of 10° C. for 10 minutes, and the polymerization was carried out at a temperature of 40° C. for 70 minutes.

The result is as follows:

Yield _____percent__ 15.2
$[\eta]$ _____ 2.56
Cis-1,4 _____percent__ 96.2
Trans-1,4 _____do____ 1.8
1,2- _____do____ 2.0

Example 4

Instead of butadiene as a catalyst component in Example 1, isoprene was used in the same amount. The catalyst solution was similarly yellowish orange and transparent. The result of the polymerization of butadiene for 55 minutes is as follows:

Yield _____percent__ 55
$[\eta]$ _____ 2.78
Cis-1,4 _____percent__ 96.7
Trans-1,4 _____do____ 1.2
1,2- _____do____ 2.1 that all the catalyst components were reduced to half the amount and the polymerization time was 2 hours.

The result is as follows:

Yield _____percent__ 64.8
$[\eta]$ _____ 5.68
Cis-1,4 _____percent__ 98.2
Trans-1,4 _____do____ 0.7
1,2- _____do____ 1.1

With the catalyst containing no butadiene as a catalyst component and prepared by contacting triethyl aluminum with the nickel naphthenate-boron trifluoride etherate reaction mixture at 10° C. for 10 minutes, the polymerization was carried out at a temperature of 40° C. for 5 hours, but only a trace of polymer was obtained.

Examples 7–10

Instead of the nickel naphthenate of Example 1, other nickel compounds were used in these Examples. The other catalyst components, conditions for catalyst preparation, amount of solvent and monomer, polymerization temperature and time were the same as of Example 1. Catalyst solutions were yellowish orange and transparent. The results are shown in Table 2.

TABLE 2

| Ex. | Nickel compound (mg. atom) | Yield (percent) | [η] | Cis-1,4 (percent) | Trans-1,4 (percent) | 1,2- (percent) |
|---|---|---|---|---|---|---|
| 7 | Nickel stearate (0.01). | 65.1 | 2.81 | 97.2 | 1.5 | 1.3 |
| 8 | Nickel acetylacetone (0.01). | 78.4 | 3.43 | 98.3 | 0.5 | 1.2 |
| 9 | Nickel acetoacetate (0.01). | 59.1 | 2.98 | 96.1 | 1.1 | 2.8 |
| 10 | Nickel carbonyl (0.01). | 77.3 | 3.39 | 96.8 | 2.5 | 0.7 |

Example 11

Nickel octenate containing 0.05 mg. atom of nickel dissolved in 5 milliliters of toluene and 0.25 millimol of boron trifluoride etherate dissolved in 5 millilters of toluene were charged in a pressure-resistant reaction vessel. The mixture was subjected to reaction at a temperature of 20° C. for 10 minutes. Then 2.5 millimols of butadiene dissolved in 5 milliliters of toluene and 0.25 millimol of butyl lithium dissolved in 5 milliliters of toluene were added thereto in this order and the mixture was aged at a temperature of 50° C. for 15 minutes. The color of the catalyst thus prepared was yellow.

7.5 grams of butadiene were polymerized in 16 milliliters of toluene in the presence of the catalyst at a temperature of 40° C. for 30 minutes.

The result is as follows:

Yield (81%) _____grams__ 6.08
[η] _____ 2.03
Cis-1,4 _____percent__ 96.8
Trans-1,4 _____do____ 1.8
1,2- _____do____ 1.4

An experiment was carried out as a control in which butadiene was not added as a catalyst component. In this case the catalyst was prepared by reacting the catalyst component mixture at 20° C. for 10 minutes. The polymerization was carried out at a temperature of 40° C. for 60 minutes.

The result is as follows:

Yield (25%) _____g__ 1.9
[η] _____ 2.32
Cis-1,4 _____percent__ 95.2
Trans-1,4 _____do____ 2.2
1,2- _____do____ 2.6

Example 12

Butadiene was polymerized at 40° C. for 2 hours with the catalyst prepared by mixing nickel naphthenate containing 0.1 mg. atom of nickel, 0.5 millimol of boron trifluoride etherate, 3.5 millimols of isoprene and 0.5 millimol of diethyl zinc in this order and by aging the resulting mixture at 60° C. for 15 minutes. The catalyst solution was yellow.

The result is as follows:

Yield (85%) _____g__ 6.38
[η] _____ 1.26
Cis-1,4 _____percent__ 95.5
Trans-1,4 _____do____ 3.2
1,2- _____do____ 1.3

The result of the polymerization carried out at the same conditions except that isoprene was not used as a catalyst component, are as follows:

Yield (28.3%) _____g__ 2.12
[η] _____ 1.05
Cis-1,4 _____percent__ 95.2
Trans-1,4 _____do____ 3.8
1,2- _____do____ 1.0

What is claimed is:

1. A method for producing polybutadiene having a high cis-1,4 content, said method comprising contacting butadiene in the liquid phase with a catalyst prepared by forming a mixture, in the presence of a hydrocarbon solvent, of a first component which is at least one compound selected from the group consisting of nickel salts of carboxylic acids and organic complex compounds of nickel, a second component which is at least one compound selected from the group consisting of boron fluoride and complex compounds thereof, a third component which is at least one compound selected from the group consisting of organo-metallic compounds of alkali metals and metals of Groups II and III of the Periodic Table and a fourth component which is an aliphatic hydrocarbon having two conjugated double bonds, said mixture being formed in a sequence such that the fourth component is added to the mixture before the first and third components react, and subjecting the mixture to aging at a temperature of 20° C. to 100° C.

2. A method according to claim 1 wherein the amount of catalyst is 0.00025–0.026 mg. atom of nickel based upon said first component per gram of butadiene to be polymerized and the first component is present to the extent of 0.02 to 2 mols, the second component is present to the extent of 0.2 to 10 mols and the fourth component is present to the extent of 0.2 to 20 mols per mol of the third component.

3. A method according to claim 1 wherein the contacting is effected at a temperature from —20° to 150° C.

4. A method according to claim 1 wherein aging is effected at a temperature between 30° C. and 8° C.

5. A method according to claim 1 wherein the contacting is effected at a temperature from 0°–100° C.

6. A method according to claim 1 wherein the first component is selected from the group consisting of the formate, acetate, octenate, naphthenate, stearate and benzoate of nickel, nickel, carbonyl, nickel salicylaldehyde, nickel acetylacetone, nickel acetoacetate, bis-(α-furyl dioxime) - nickel and bis - (salicylaldehyde) - ethylene diimine nickel.

7. A method according to claim 1 wherein the complex compound of boron fluoride is boron trifluoride etherate.

8. A method according to claim 1 wherein the third component is selected from the group consisting of lithium, sodium, zinc, cadmium and aluminum alkyls and dialkyl aluminum halides.

9. A method according to claim 1 wherein the fourth component is selected from the group consisting of butadiene, dimethyl butadiene and isoprene.

10. A butadiene polymerization catalyst consisting of
   (a) a first component selected from the group consisting of nickel salts of carboxylic acids and organic complex compounds of nickel;
   (b) a second component selected from the group consisting of boron fluoride and complex compounds thereof;
   (c) a third component selected from the group consisting of organometallic compounds of alkali metals and metals of Groups II and III of the Periodic Table and
   (d) a fourth component selected from aliphatic hydrocarbons having two conjugated double bonds.

11. A butadiene polymerization catalyst according to claim 10 wherein the first component is present to the extent of 0.02 to 2 mols, the second component is present to the extent of 0.2 to 10 mols and the fourth component is present to the extent of 0.2 to 20 mols per mol of the third component.

12. A butadiene polymerization catalyst according to claim 10 wherein the first component is selected from the group consisting of the formate, acetate, octenate, naphthenate, stearate and benzoate of nickel, nickel carbonyl, nickel salicylaldehyde, nickel acetylacetone, nickel acetoacetate, bis-($\alpha$-furyl dioxime)-nickel and bis-(salicylaldehyde)-ethylene diimine nickel.

13. A butadiene polymerization catalyst according to claim 10 wherein the complex compound of boron fluoride is boron trifluoride etherate.

14. A butadiene polymerization catalyst according to claim 10 wherein the third component is selected from the group consisting of lithium, sodium, zinc, cadmium and aluminum alkyls and dialkyl aluminum halides.

15. A butadiene polymerization catalyst according to claim 10 wherein the fourth component is selected from the group consisting of butadiene, dimethyl butadiene and isoprene.

References Cited

UNITED STATES PATENTS

| 3,170,905 | 2/1965 | Ueda et al. | 260—94.3 |
| 3,177,183 | 4/1965 | Naylor et al. | 260—82.1 |

FOREIGN PATENTS 1,115,024  10/1961  Germany.

JOSEPH L. SCHOFER, Primary Examiner

R. A. GAITHER, Assistant Examiner

U.S. Cl. X.R.

252—429